Reissued Mar. 4, 1941

Re. 21,737

UNITED STATES PATENT OFFICE 21,737

RESIN BONDED ABRASIVE ARTICLE

Samuel S. Kistler, West Boylston, and Carl E. Barnes, Worcester, Mass., assignors to Norton Company, Worcester, Mass., a corporation of Massachusetts No Drawing. Original No. 2,189,734, dated February 6, 1940, Serial No. 187,551, January 28, 1938. Renewed October 31, 1939. Application for reissue September 3, 1940, Serial No. 355,211

2 Claims. (Cl. 51—298)

The invention relates to abrasive articles bonded with modified polymers of acrylic acid and substituted acrylic acids in which the substituent is either methyl or chlorine and their derivatives.

One object of the invention is to provide an abrasive article bonded with a hard resin of the class indicated. Another object of the invention is to provide an abrasive article bonded with a heat resistant resin of the class indicated, preferably softening above 100° C. Another object of the invention is to provide a grinding wheel bonded with a synthetic resin having some of the characteristics of shellac bonded grinding wheels. Another object of the invention is to provide a grinding wheel bonded with a synthetic resin, having some of the characteristics of rubber. Another object of the invention is to provide a grinding wheel bonded with a synthetic resin having characteristics superior to either those of shellac or rubber for certain purposes and capable of substantial duplication in its physical properties. Another object of the invention is to provide a grinding wheel bonded with a synthetic resin having definite characteristics advantageous for the manufacture of grinding wheels.

Another object of the invention is to provide a grinding wheel bonded with a synthetic resin having one or more of the following characteristics: Soft as compared with phenol-formaldehyde, readily controllable, resistant to heat as compared with shellac and rubber, and capable of being incorporated in a wide range of products. Another object of the invention is to provide a grinding wheel bonded with a resin capable of being made in different degrees of hardness. Other objects will be in part obvious or in part pointed out hereinafter.

The invention accordingly consists in the combinations of elements and arrangements of parts as will be illustratively described herein, and the scope of the application of which will be indicated in the following claims.

It is known that the esters of acrylic acid and substituted acrylic acids, for example alpha methyl acrylic acid and alpha chloro acrylic acid, polymerize to form transparent solids having many useful properties. For the bonding of abrasive products, however, the low softening points of these materials may be a disadvantage.

We accordingly propose to copolymerize a suitable ester of acrylic acid or an alpha substituted acrylic acid in which the substituent is either methyl or chlorine with a compatible polymerizable hardening agent comprising acrylic acid or an alpha substituted acid of the class indicated. We may use the ester and acrylic acid or its alpha substitution products indicated alone or in combination with a third substance containing more than one unsaturated group per molecule, each unsaturated group being capable of independent polymerization. Such substances containing more than one unsaturated group per molecule may be any of the polyhydric alcohol esters of acrylic acid or the indicated alpha substitution products. As examples of the polyhydric alcohols, we mention ethylene glycol, diethylene glycol, triethylene glycol, glycerol, Pentaglycerol, trimethylene glycol, pentaerythritol, and mannitol. Another suitable substance which contains more than one unsaturated group per molecule is an allyl ester of acrylic or the alpha substituted acrylic acid.

As an example of making a heat resistant resin using methyl methacrylate and methacrylic acid (alpha methyl acrylic acid), we give the following:

Example I

To seventy-five cubic centimeters of methyl methacrylate and twenty-five cubic centimeters of methacrylic acid, one-hundredth gram of benzoyl peroxide is added. This mixture is heated at a temperature of 60° C. for a period of twenty-four hours. Following this it is given a final cure at 110° C. for eight hours.

This product is a solid and substantially matured.

Characteristics of this resin are that it is transparent and quite clear and, furthermore, is more heat resistant than polymeric methyl methacrylate unmodified.

We have made resins of methyl methacrylate with methacrylic acid and have measured the tensile strengths of test pieces and the results are given in the following tables in which the diameter and area refer to the cross section of a cylindrical test piece:

TABLE I

*Tensile strength of resin at 160° C.*

| Percentage of methacrylic acid by volume | Diameter | Area | Breaking point | Tensile strength |
|---|---|---|---|---|
| | *Inches* | *Sq. in.* | *Pounds* | *Lbs./in.²* |
| 2½ | .126 | .0124 | 3.7 | 298 |
| 2½ | .129 | .0130 | 4.1 | 315 |
| 2½ | .135 | .0142 | 4.1 | 289 |
| 2½ | .130 | .0122 | 3.7 | 303 |
| 2½ | .120 | .0113 | 2.8 | 248 |
| 5 | .109 | .0093 | 3.4 | 366 |
| 5 | .105 | .0087 | 3.6 | 415 |
| 5 | .143 | .0160 | 4.9 | 306 |
| 5 | .111 | .0097 | 3.8 | 392 |
| 5 | .106 | .0088 | 3.6 | 410 |
| 10 | .131 | .0134 | 5.3 | 395 |
| 10 | .130 | .0132 | 5.5 | 416 |
| 10 | .131 | .0134 | 5.3 | 395 |
| 10 | .132 | .0136 | 4.8 | 353 |
| 10 | .131 | .0134 | 5.3 | 395 |
| 20 | .130 | .0132 | 6.0 | 455 |
| 20 | .130 | .0132 | 6.0 | 455 |
| 20 | .131 | .0134 | 6.1 | 455 |
| 20 | .131 | .0134 | 5.9 | 440 |
| 20 | .131 | .0134 | 6.2 | 463 |

TABLE II

*Tensile strength of resin at 130° C.*

| Percentage of methacrylic acid by volume | Diameter | Area | Breaking point | Tensile strength |
|---|---|---|---|---|
| | *Inches* | *Sq. in.* | *Pounds* | *Lbs./in.²* |
| 2½ | .127 | .0126 | 70 | 555 |
| 2½ | .128 | .0128 | 62 | 485 |
| 2½ | .126 | .0124 | 64 | 508 |
| 2½ | .128 | .0128 | 73 | 570 |
| 2½ | .125 | .0123 | 68 | 553 |
| 2½ | .128 | .0128 | 67 | 524 |
| 2½ | .131 | .0135 | 73 | 540 |
| 5 | .107 | .0090 | 62 | 689 |
| 5 | .109 | .0093 | 61 | 655 |
| 5 | .132 | .0136 | 84 | 619 |
| 5 | .108 | .0092 | 61 | 664 |
| 5 | .115 | .0104 | 67 | 645 |
| 5 | .108 | .0092 | 61 | 664 |
| 10 | .131 | .0134 | 89 | 665 |
| 10 | .130 | .0133 | 70 | 539 |
| 10 | .130 | .0133 | 69 | 519 |
| 10 | .131 | .0134 | 87 | 650 |
| 10 | .131 | .0134 | 80 | 597 |
| 20 | .130 | .0133 | 190 | 1430 |
| 20 | .129 | .0130 | 216 | 1660 |
| 20 | .130 | .0133 | 194 | 1460 |
| 20 | .130 | .0133 | 182 | 1370 |
| 20 | .131 | .0134 | 209 | 1560 |

We will now give several examples of the manufacture of grinding wheels bonded with the novel resin hereinbefore indicated. A grinding wheel consists of abrasive grain bonded with a given bond which holds the individual grains together in the form of an integral wheel. Other abrasive bodies such as bricks, segments and the like are to be deemed included within the following description and the methods and substances indicated may be used for the manufacture of other abrasive wheels, such as lapping wheels, regulating wheels and the like. For the abrasive we may use any of the usual or known types, such as any variety of alumina, e. g., fused alumina, emery and corundum, and we may also use silicon carbide or diamonds. Other abrasives such as garnet, quartz, and any of the hard carbides, for example boron carbide or tungsten carbide, might be employed. Among the following examples, we will show how resins may be produced as the copolymers of methyl methacrylate with methacrylic acid and one or more of the esters of methacrylic acid and a polyhydric alcohol or allyl alcohol, as hereinbefore set forth.

Our novel resin, so far as certain broad aspects are concerned, constitutes on the one hand the copolymerization product of acrylic acid or its alpha substitution products in which the substituent is either methyl or chlorine with monohydric alcohol esters of acrylic acid or the alpha substitution products and, on the other hand, the copolymerization product of acrylic acid or the alpha substitution products with monohydric alcohol esters of acrylic acid or the alpha substitution products combined with polyhydric alcohol esters of acrylic acid or the alpha substitution products or other polymerizable compound containing more than one independently polymerizable group per molecule.

As examples of the manufacture of grinding wheels according to and illustrating the foregoing, we give the following:

EXAMPLE II

We mix sixteen hundred and fifty-six grams of suitable abrasive with three hundred and sixty-five cubic centimeters of monomeric methyl methacrylate, one hundred and twenty-five cubic centimeters of monomeric methacrylic acid, and ten cubic centimeters of methyl methacrylate containing one per cent benzoyl peroxide catalyst. The mixture is placed in an aluminum mold consisting of a cylindrical dish having slightly tapering sides and a tightly fitting aluminum cover. An aluminum core of suitable dimensions is placed in the center. Placing the cover upon the mold, we place the mold in an oven and heat to 60° C. for twenyt-four hours. We then give the wheel a further baking for a period of ten hours at 110° C. Either before or after the final baking above specified, we strip the wheel from the mold. We then face and true the wheel.

EXAMPLE III

Proceeding as specified in Example II so far as the various steps including the heat and use of the mold are concerned, we may make a grinding wheel with sixteen hundred and fifty-six grams of suitable abrasive and the following bond mixture: three hundred and thirty cubic centimeters of methyl methacrylate, one hundred cubic centimeters of methacrylic acid, fifty cubic centimeters of ethylene glycol dimethacrylate, one hundred and twenty cubic centimeters of methyl methacrylate containing one per cent benzoyl peroxide catalyst.

EXAMPLE IV

For the manufacture of grinding wheels, we may prefer under some circumstances to produce first a powdered polymer, then, proceed to add the powder to the abrasive grains and mix thoroughly. The abrasive may be wet with a suitable liquid before adding the powder. A grinding wheel according to this example and procedure may be made of suitable abrasive grains, the powder having been first produced as follows: To one hundred and fifty cubic centimeters of methacrylic acid and four hundred and fifty cubic centimeters of methyl methacrylate is added six-tenths gram of benzoyl peroxide. This mixture is then added to fourteen hundred cubic centimeters of carbon tetrachloride in which it is completely miscible, and placed in a constant temperature bath maintained at 65° C. After an induction period of about five hours the copolymer, being insoluble in the carbon tetrachloride, begins to precipitate as a fine powder and is filtered off, washed with carbon tetrachloride and dried.

We mix sixteen hundred and fifty-six grams of abrasive grain with five hundred grams of the above described powder and place in a mold. We press the mixture for thirty minutes in an hydraulic press with platens heated to one hundred and sixty degrees Centigrade, then strip from the mold. The wheel is then complete, the heat and pressure having softened and coalesced the resin so that it forms with the abrasive grain an integral piece.

Proceeding as heretofore outlined in Example IV, we may make a powder from methyl methacrylate, methacrylic acid and one of the esters containing more than one polymerizable unsaturated group per molecule.

In the examples given, we have used only the esters of methacrylic acid. It is to be understood, however, that the esters of alpha chloro acrylic acid may be used within the scope of this invention. Also, whereas the methyl ester of methacrylic acid is most commonly referred to, other monohydric alcohol esters, such as isopropyl, isobutyl or phenyl esters could equally well have been used.

While we have described the production of grinding wheels made from abrasive grains and resin alone, it is to be understood that we may also incorporate a wide variety of fillers. In case the resin is polymerized in situ, the filler must not contain inhibitors that will prevent the polymerization.

The present patent is directed to our novel abrasive articles. The novel method of making grinding wheels herein disclosed together with the novel resin composition of matter are claimed in separate copending applications Serial Nos. 187,549 and 187,547, filed on January 28, 1938, and in Serial No. 311,934 which is a continuation of Serial No. 187,547.

It will thus be seen that there has been provided by this invention a composition of matter and article of manufacture in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

We claim:

1. As an article of manufacture, abrasive grains bonded with a copolymer of compounds comprising methyl methacrylate and methacrylic acid.

2. As an article of manufacture, abrasive grains bonded with a copolymer of compounds comprising an acid selected from the group consisting of acrylic acid and its alpha substitution products in which the substitutent is selected from the group consisting of methyl and chlorine, and a monohydric alcohol ester of an acid selected from the aforesaid group.

SAMUEL S. KISTLER.
CARL E. BARNES.